United States Patent
Suzuki et al.

(10) Patent No.: US 9,495,109 B2
(45) Date of Patent: Nov. 15, 2016

(54) STORAGE CONTROLLER, VIRTUAL STORAGE APPARATUS, AND COMPUTER READABLE RECORDING MEDIUM HAVING STORAGE CONTROL PROGRAM STORED THEREIN

(71) Applicant: FUJITSU LIMITED, Kawasaki-shi, Kanagawa (JP)

(72) Inventors: Ryosuke Suzuki, Kawasaki (JP); Tooru Kobayashi, Kawasaki (JP); Sugio Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 8 days.

(21) Appl. No.: 14/613,635

(22) Filed: Feb. 4, 2015

(65) Prior Publication Data
US 2015/0242148 A1    Aug. 27, 2015

(30) Foreign Application Priority Data
Feb. 21, 2014  (JP) .................................. 2014-031846

(51) Int. Cl.
G06F 12/00    (2006.01)
G06F 3/06    (2006.01)

(52) U.S. Cl.
CPC ........... *G06F 3/0619* (2013.01); *G06F 3/0665* (2013.01); *G06F 3/0689* (2013.01)

(58) Field of Classification Search
CPC .................................. G06F 12/00; G06F 3/06
USPC .......................... 711/100, 113, 114, 154, 200
See application file for complete search history.

(56) References Cited

U.S. PATENT DOCUMENTS

| | | | |
|---|---|---|---|
| 2010/0125715 A1 | 5/2010 | Takamatsu et al. | |
| 2011/0167236 A1 | 7/2011 | Orikasa et al. | |
| 2011/0185120 A1 | 7/2011 | Jess | |
| 2013/0185531 A1* | 7/2013 | Emaru | G06F 3/061 711/162 |
| 2013/0282981 A1 | 10/2013 | Orikasa et al. | |
| 2014/0189236 A1* | 7/2014 | Li | G06F 3/061 711/114 |

FOREIGN PATENT DOCUMENTS

| | | |
|---|---|---|
| JP | 2005-505035 | 2/2005 |
| JP | 2010-122814 | 6/2010 |
| JP | 2011-154669 | 8/2011 |
| WO | 03/027856 | 4/2003 |
| WO | 2011/077489 | 6/2011 |

* cited by examiner

*Primary Examiner* — Tuan Thai
(74) *Attorney, Agent, or Firm* — Fujitsu Patent Center

(57) ABSTRACT

A storage controller that controls a virtual storage apparatus is provided, the storage controller includes: a performance measuring unit that obtains performance information on a plurality of volumes present in the virtual storage apparatus; a grouping unit that groups the plurality of volumes into a plurality of performance groups, each of the plurality of performance groups having a different performance requirement, based on the performance information on the plurality of volumes and a grouping rule; and a storage pool managing unit that adds, to a storage pool, one of volumes grouped into the plurality of performance groups until a requirement condition for the storage pool is met, the performance groups from which a virtual volume being to be reserved.

9 Claims, 16 Drawing Sheets

FIG. 3

| PHYSICAL VOLULE ID | SEQUENTIAL READ | SEQUENTIAL WRITE | RANDOM READ | RANDOM WRITE | ... | TOTAL SCORE |
|---|---|---|---|---|---|---|
| LUN010 | 10 | 10 | 10 | 10 | ... | 100 |
| LUN005 | 10 | 9 | 9 | 8 | ... | 82 |
| LUN001 | 10 | 10 | 8 | 9 | ... | 85 |
| LUN003 | 8 | 8 | 5 | 6 | ... | 57 |
| LUN00x | 8 | 8 | 5 | 5 | | 54 |
| ⋮ | | | | | | ⋮ |

FIG. 6

| PHYSICAL VOL. ID 211 | DUPLICITY ID 212 | PERFORM. SCORE 213 | PERFORM. GROUP 214 | UPDATE PERFORM. SCORE 215 | UPDATE PERFORM. GROUP 216 |
|---|---|---|---|---|---|
| | | | | | |
| | | | | | |
| | | | | | |

| PHYSICAL VOL. ID | DUPLICITY ID | PERFORM. SCORE | PERFORM. GROUP | UPDATE PERFORM. SCORE | UPDATE PERFORM. GROUP |
|---|---|---|---|---|---|
| LUN001 | 0 | 85 | GROUP 9 | — | — |
| LUN002 | 1 | 53 | GROUP 6 | — | — |
| LUN003 | 1 | 57 | GROUP 6 | — | — |
| LUN004 | 2 | 92 | GROUP 10 | — | — |
| LUN005 | 3 | 82 | GROUP 9 | — | — |
| ·· | | | | | ·· |

FIG. 13

| PHYSICAL VOL. ID | PERFORM. SCORE | PERFORM. GROUP | UPDATE PERFORM. SCORE | UPDATE PERFORM. GROUP |
|---|---|---|---|---|
| LUN001 | 85 | GROUP 9 | 73 | GROUP 8 |
| LUN002 | 53 | GROUP 6 | 41 | GROUP 5 |
| LUN003 | 57 | GROUP 6 | 41 | GROUP 5 |
| LUN004 | 92 | GROUP 10 | 82 | GROUP 9 |
| LUN005 | 82 | GROUP 9 | 70 | GROUP 7 |
| ⋮ | ⋮ | ⋮ | ⋮ | ⋮ |
| LUN0xx | — | — | 97 | GROUP 10 |
| LUN0yy | — | — | 100 | GROUP 10 |

FIG. 14

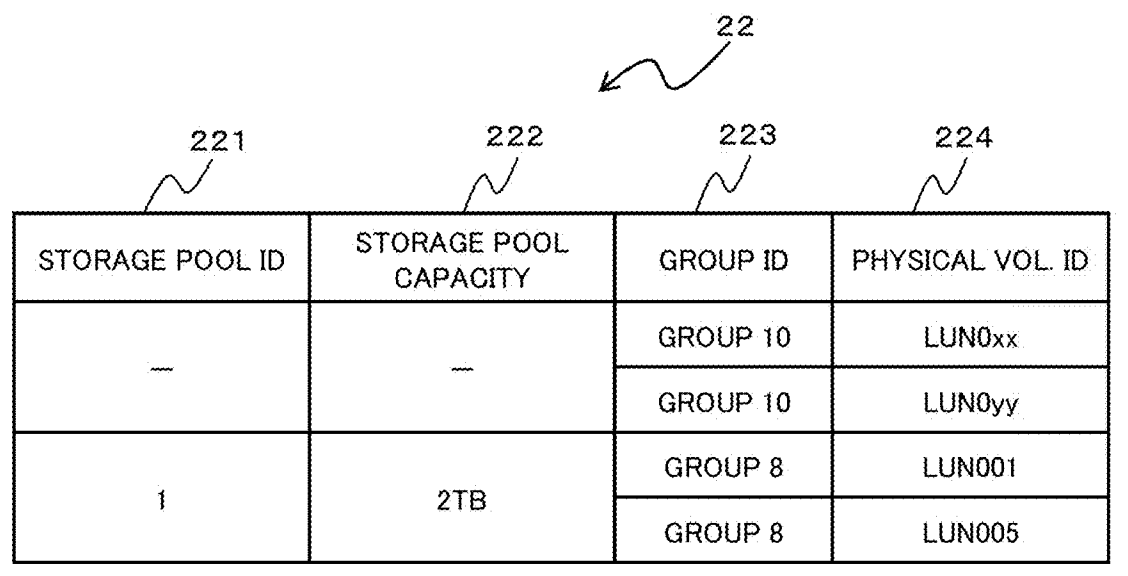

| STORAGE POOL ID 221 | STORAGE POOL CAPACITY 222 | GROUP ID 223 | PHYSICAL VOL. ID 224 |
|---|---|---|---|
| — | — | GROUP 10 | LUN0xx |
| 1 | 2TB | GROUP 10 | LUN0yy |
| | | GROUP 8 | LUN001 |
| | | GROUP 8 | LUN005 |

22

STORAGE CONTROLLER, VIRTUAL STORAGE APPARATUS, AND COMPUTER READABLE RECORDING MEDIUM HAVING STORAGE CONTROL PROGRAM STORED THEREIN

CROSS-REFERENCE TO RELATED APPLICATION

This application is based upon and claims the benefit of priority of the prior Japanese Patent application No. 2014-031846, filed on Feb. 21, 2014, the entire contents of which are incorporated herein by reference.

FIELD

The embodiment discussed herein is related to a storage controller, a virtual storage apparatus, and a non-transitory computer readable recording medium having a storage control program stored therein.

BACKGROUND

In recent years, with a rapid increase in the size of data being processed in information processing systems, a technique known as "storage virtualization" has been utilized for accommodating the increased data size.

The storage virtualization is a technique that enables multiple storage apparatuses to be virtually unified to form a large-capacity storage pool. The storage virtualization provides flexible configurations of storage pools in accordance with the business situations, by allocating areas necessary for the business from the storage pool, or by freeing up any areas that are not required anymore. Inputs and outputs (I/Os) are distributed across a virtual storage apparatus, which prevents any delays due to a heavy I/O loads converged on a particular storage apparatus.

Apparatuses which realize such storage virtualization are known as "storage virtualization apparatuses". Storage apparatuses having storage pools which are embodied by such storage virtualization apparatuses are known as "virtual storage apparatuses".

FIG. 16 is a schematic diagram illustrating a configuration of a conventional virtual storage apparatus 103.

The virtual storage apparatus 103 includes a storage virtualization apparatus 108 and a disk array apparatus 105. The disk array apparatus 105 includes control modules (CMs) 104-1 and 104-2 (CM #0 and CM #1) and multiple redundant array of independent disks (RAIDs) 401-403 (RAID #0-#2).

The storage virtualization apparatus 108 and the RAIDs 401-403 are connected via the CMs 104-1 and 104-2.

The storage virtualization apparatus 108 configures one or more storage pools 106 (storage pool #0) from physical volumes (not illustrated) created in the multiple RAIDs 401-403, and reserves a certain capacity from these storage pools 106 and provides a higher-level host apparatus with it as a virtual volume.

As used herein, the term "physical volume" refers to any storage area provided by the disk array apparatuses 4-1 to 4-*m*, and corresponds to a logical unit (LUN). Physical volumes are actually logical volumes, and are not the physical disk apparatuses, such as hard disk drives (HDDs) or solid state drives (SSDs); hereinafter, such physical volumes are collectively referred to as "physical disks", and physically retain data in the RAIDs 401-403. For the sake of clarity, they are referred to as "physical volumes" herein in order to differentiate them from virtual volumes (described later) which are logical volumes.

The RAIDs 401-403 include physical disks, such as HDDs and/or SSDs, which provide storage areas for data. Furthermore, one or more physical volumes are created (defined) in the respective RAIDs 401-403.

In the virtual storage apparatus 103 as described above, in general, in order to improve the performance and/or distribute loads, configurations called "striping" have been widely adopted, wherein storage areas are reserved from the physical disks and are presented to a host apparatus and the like, as a single virtual volume.

In the virtual storage apparatus 103, physical disks in a wide variety of storage types (e.g., vendors, models, disk types) are used in physical volumes included in the storage pools 106. When a stripe is configured in the virtual storage apparatus 103, the performance of the resulting virtual volume is limited to the performance of the slowest physical volume.

As an example, one storage pool 106 is configured from physical volumes in the multiple RAIDs 401-403 having different RAID levels, such as from RAID 401 of RAID 5 (of which access speed is lower) and RAIDs 402 and 403 of RAID 1+0 (of which access speeds are higher). In this case, RAID 401 of RAID 5 which has an access speed slower compared to that of RAID 1+0 lowers the entire performance of the storage pools 106.

Such a performance difference is also caused by other differences, such as differences in disk type (e.g., HDDs or SSDs), or spin speeds of HDDs.

Furthermore, even if there is no difference in the performances of the physical volumes in the RAIDs 401-403, a system administrator may erroneously generate an unintended deterioration in the performance by making an error when a storage pools 106 is created manually.

Thus, in a virtual storage apparatus having a storage pool configured from physical volumes, it is desirable to enable a creation of a storage pool in a simplified manner without requiring any knowledge of the performances and/or characteristics of the physical volumes.

SUMMARY

In one aspect, provided is a storage controller that controls a virtual storage apparatus, the storage controller including: a performance measuring unit that obtains performance information on a plurality of volumes present in the virtual storage apparatus; a grouping unit that groups the plurality of volumes into a plurality of performance groups, each of the plurality of performance groups having a different performance requirement, based on the performance information on the plurality of volumes and a grouping rule; and a storage pool managing unit that adds, to a storage pool, one of volumes grouped into the plurality of performance groups until a requirement condition for the storage pool is met, the performance groups from which a virtual volume being to be reserved.

In another aspect, provided is a virtual storage apparatus, including: a plurality of volumes; and a storage controller, the storage controller comprising: a performance measuring unit that obtains performance information on the plurality of volumes; a grouping unit that groups the plurality of volumes into a plurality of performance groups, each of the plurality of performance groups having a different performance requirement, based on the performance information on the plurality of volumes and a grouping rule; and a storage pool managing unit that adds, to a storage pool, one of volumes grouped into the plurality of performance groups until a requirement condition for the storage pool is met, the performance groups from which a virtual volume being to be reserved.

In another aspect, provided is a non-transitory computer readable recording medium storing a storage control program for controlling a virtual storage apparatus, when being executed by a computer, the storage control program causing the computer to execute processing of: obtaining performance information on a plurality of volumes present in the virtual storage apparatus; grouping the plurality of volumes into a plurality of performance groups, each of the plurality of performance groups having a different performance requirement, based on the performance information on the plurality of volumes and a grouping rule; and adding, to a storage pool, one of volumes grouped into the plurality of performance groups until a requirement condition for the storage pool is met, the performance groups from which a virtual volume being to be reserved.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a table illustrating examples of performance scores obtained by a performance measuring unit as an example of an embodiment;

FIG. 6 is a diagram illustrating a structure of a management table as an example of an embodiment;

FIG. 10 is a schematic diagram illustrating an example of a management table after Steps S13 and S14 in FIG. 9;

FIG. 13 is a schematic diagram illustrating an example of a management table after Steps S25 and S26 in FIG. 11;

FIG. 14 is a diagram illustrating an example of a storage pool table as an example of an embodiment;

DESCRIPTION OF THE PREFERRED EMBODIMENTS

A storage controller, a virtual storage apparatus, a method of controlling a storage, and a storage control program, as an example of the present embodiment, will be described with reference to the drawings. Note that the embodiments discussed herein are merely exemplary, and it is not intended that various modifications and applications of the teachings not explicitly described are omitted. In other words, the embodiments may be modified, within the scope of the spirit of the embodiments (such as combinations of embodiments and modifications).

(A) Configuration

Figure 1:
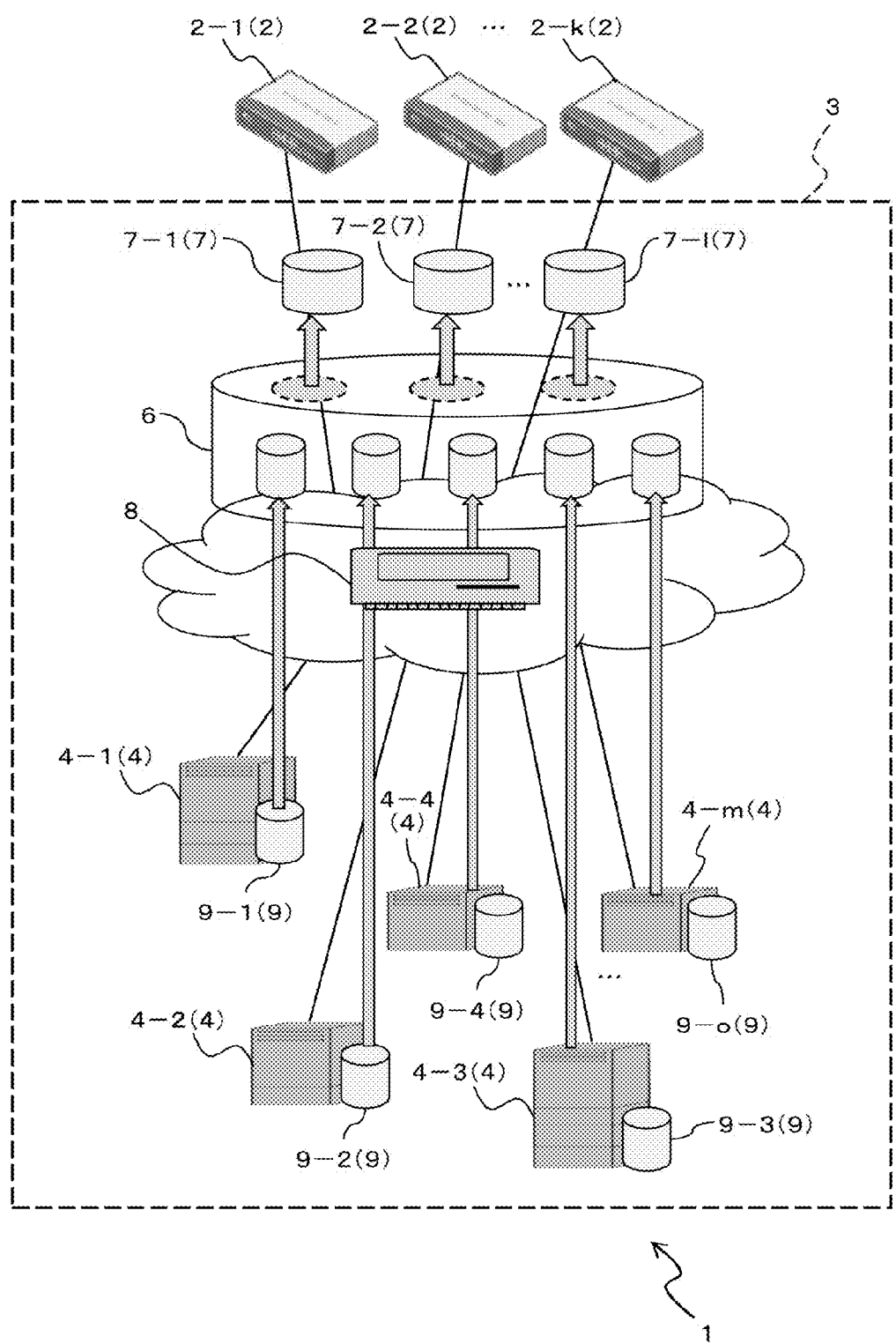
FIG. 1 is a schematic diagram illustrating a configuration of an information processing system as an example of an embodiment.

FIG. 1 is a schematic diagram illustrating a configuration of an information processing system 1 as an example of an embodiment.

In this information processing system 1, a virtual storage apparatus 3 is communicatively connected to one or more host apparatuses 2-1 to 2-$k$ ($k$ is an integer of 1 or greater). The host apparatuses 2 are connected to the virtual storage apparatus 3 via a network, e.g., a local area network (LAN) or a network compliant with the Internet Small Computer System Interface (iSCSI).

The host apparatuses 2-1 to 2-$k$ are computers having server functions, for example, each including a central processing unit (CPU) and a memory (which are not illustrated). The host apparatuses 2-1 to 2-$k$ read and write data from and to one or more virtual volumes 7-1 to 7-$l$ ($l$ is an integer of 1 or greater), provided by the virtual storage apparatus 3, by sending disk access command, such as read or write commands, to the virtual storage apparatus 3.

The virtual storage apparatus 3 includes a storage virtualization apparatus 8 and disk array apparatuses 4-1 to 4-$m$ ($m$ is an integer of 2 or greater).

The storage virtualization apparatus 8 pools physical volumes 5-1 to 5-$n$ ($n$ is an integer of 2 or greater) (see FIGS. 4 and 5) created (defined) in disk array apparatuses 4-1 to 4-$m$, into a storage pool 6, and provides the host apparatus 2, with the one or more virtual volumes 7-1 to 7-$l$ from the storage pool 6.

The disk array apparatuses 4-1 to 4-$m$ are RAID disk array apparatuses, including multiple physical disks 9-1 to 9-$o$ ($o$ is an integer of 2 or greater), such as HDDs and SSDs, which can store data, for example. One or more of the disk array apparatuses 4-1 to 4-$m$ construct a single RAID group. Each of the disk array apparatuses 4-1 to 4-$m$ includes one or more physical volumes 5-1 to 5-$n$ created (defined) therein.

As used herein, the term "physical volume" refers to any storage area allocated by the disk array apparatuses 4-1 to 4-$m$, and corresponds to a LUN. Physical volumes are actually logical volumes, and are not the physical disks 9-1 to 9-$o$ which physically retain data in the disk array apparatuses 4-1 to 4-$m$. For the sake of clarity, they are referred to as "physical volumes" herein in order to differentiate them from the virtual volumes 7-1 to 7-$l$ which are logical volumes.

Hereinafter, "physical volumes" may also be referred to as "LUNs".

In the virtual storage apparatus 3 of the present embodiment, the physical volumes 5-1 to 5-$n$ may be created in a single RAID group, or may be created across multiple RAID groups.

Note that, hereinafter, when referring to a specific one of multiple disk array apparatuses, reference symbols 4-1 to 4-m are used, whereas a reference symbol 4 is used when referring to any of disk array apparatuses.

Similarly, hereinafter, when referring to a specific one of multiple physical volumes, reference symbols 5-1 to 5-n are used, whereas a reference symbol 5 is used when referring to any of physical volumes.

Further, hereinafter, when referring to a specific one of multiple virtual volumes, reference symbols 7-1 to 7-l are used, whereas a reference symbol 7 is used when referring to any of virtual volumes.

Figure 2:
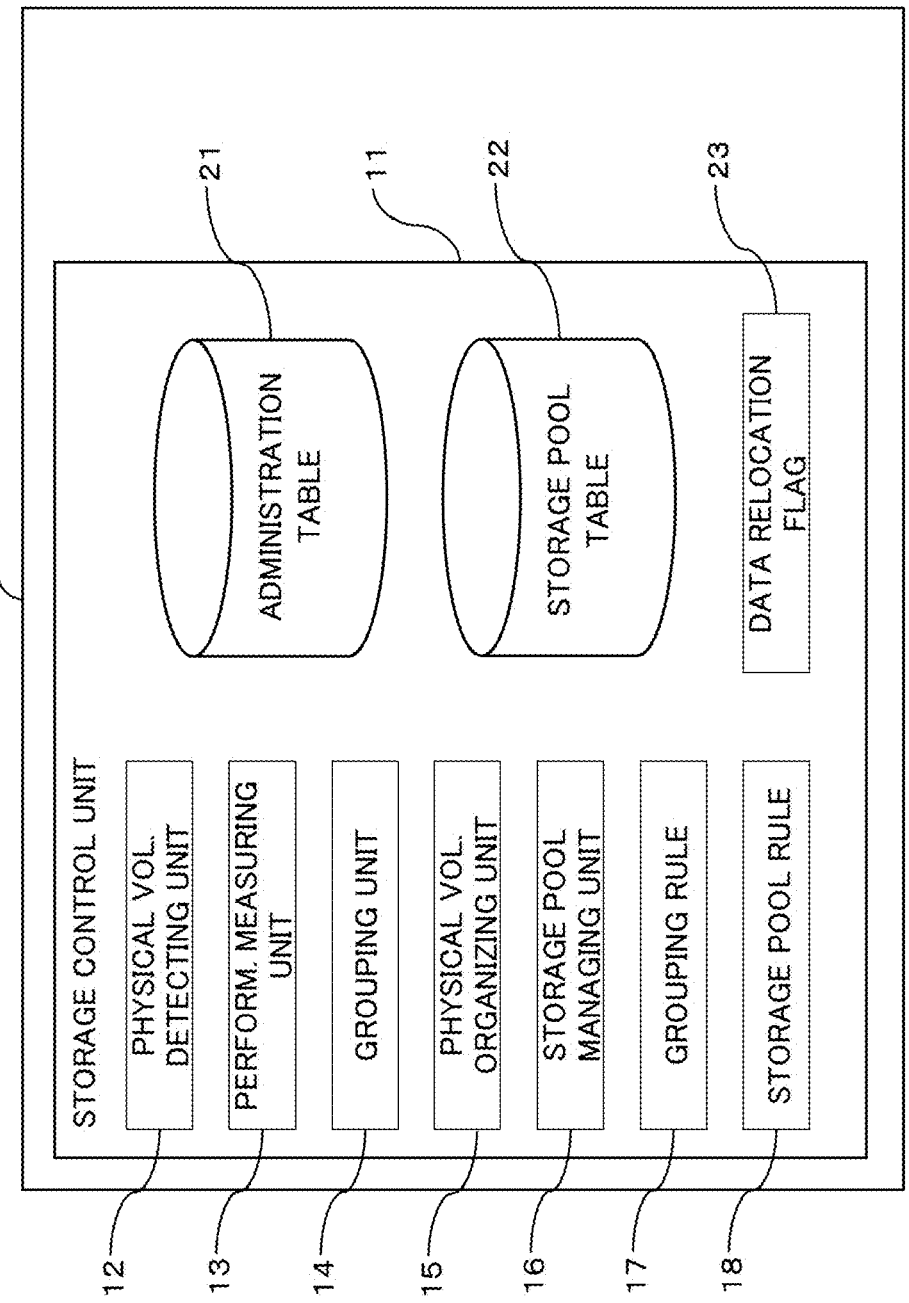
FIG. 2 is a schematic diagram illustrating a configuration of a storage virtualization apparatus as an example of an embodiment.

FIG. 2 is a schematic diagram illustrating a configuration of the storage virtualization apparatus 8 as an example of an embodiment.

The storage virtualization apparatus 8 includes a storage control unit (storage controller) 11.

The storage control unit 11 virtually bundles physical volumes 5 created in the disk array apparatuses 4, into one or more storage pools 6, allocates a virtual volume 7 from the storage pools 6, and provides the host apparatus 2 with the allocated virtual volume 7. In the present embodiment, the storage control unit 11 provides physical volumes 5 having virtually a performance equivalent to the storage pools 6, irrespective of the performances and configurations of the disk array apparatuses 4.

As used herein, the expression "physical volumes 5 have similar or the same performances" means that the difference in the performances of physical volumes 5 falls within a predetermined range (e.g., 5%). The term "performance" means the performance value, the performance score, and/or the total performance score required by a performance measuring unit 13 (described later). The term "performance values" refers to measurements indicating the respective performances of physical volumes 5, such as the data transfer rate, the response time, the Input Output per Second (IOPS). The term "performance scores" refers to normalized scores in a range between 0 and 10, for example, of the respective performances of the physical volumes 5. The term "total performance scores" refers to the respective sums of the scores of the physical volumes 5.

The storage control unit 11 includes a physical volume detecting unit (volume detecting unit) 12, a performance measuring unit 13, a grouping unit 14, a physical volume organizing unit (reorganizing unit) 15, a storage pool managing unit 16, a grouping rule 17, a storage pool rule (requirement condition) 18, a management table 21, a storage pool table 22, and a data relocation flag 23.

The physical volume detecting unit 12 receives, from the disk array apparatus 4, a remote state change notification (RSCN) indicating that a new physical volume 5 has been created (added) in the disk array apparatus 4, and becomes aware of the creation of the new physical volume 5 in the disk array apparatus 4, for example. RSCNs are well-known in the art, and descriptions thereof is omitted.

The performance measuring unit 13 executes a performance verification for the physical volume 5 detected by the physical volume detecting unit 12, to obtain a performance score for each predetermined access pattern and to calculate a total performance score. Specifically, the performance measuring unit 13 performs I/O runs (i.e., by issuing I/Os and receiving responses) on the physical volumes 5 for validating the performances, and obtains performance measurements, such as data transfer rates, response times, IOPS, of those I/O runs. The performance measuring unit 13 then converts a performance value obtained for each access pattern, into a performance score normalized in a range between 0 and 10, for example. The performance measuring unit 13 also deduces duplicities (multiplicities), as will be described later.

For example, the performance measuring unit 13 performs I/O runs on the physical volumes 5, by combining access patterns, such as a Sequential Read, a Sequential Write, a Random Read, and a Random Write. In this case, the performance measuring unit 13 performs I/O runs at a time on multiple physical volumes 5, for checking that no deterioration of the performances arises.

Here, the reason why the performance measuring unit 13 performs I/O runs at a time on multiple physical volumes 5 will be described.

When multiple physical volumes 5 are created from a single RAID group, performance values of a single physical volume 5 are higher than performance values when loads are at a time applied on multiple physical volumes 5 in a single RAID group. In other words, whether multiple physical volumes 5 are created from a single RAID group or not significantly affects the performance values of that particular physical volumes 5.

As used therein, for a certain physical volume 5, the total number of physical volumes 5 created from a RAID group to which that particular physical volume 5 belongs is referred to as the "duplicity".

When a RAID group is configured from multiple disk array apparatuses 4, the duplicity of the physical volume 5 can be determined by checking the identification information (worldwide node name, or WWNN) of each disk array apparatus 4.

When a RAID group is configured from a single disk array apparatus 4, however, the duplicity of a physical volume 5 in this disk array apparatus 4 cannot be determined from the WWNN of the disk array apparatus 4.

Accordingly, when the duplicity of a physical volume 5 cannot be determined from information, such as the WWNN, of a disk array apparatus 4, the performance measuring unit 13 deduces the respective duplicities of the physical volumes 5 by executing performance verifications at a time on multiple physical volumes 5.

The performance measuring unit 13 executes performance verifications by applying I/O loads at a time on some among the physical volumes 5, such as the physical volumes 5-1 and 5-2, for example, to obtain the duplicities of the physical volumes 5-1 and 5-2.

If the total sum of performance values (or performance scores) of the physical volumes 5-1 and 5-2 is nearly the twice of the higher performance value of the two physical volumes 5, the performance measuring unit 13 deduces that the physical volumes 5-1 and 5-2 were not created from a single RAID group (i.e., these physical volumes 5 are independent). The performance measuring unit 13 then assigns different duplicity IDs to the physical volumes 5-1 and 5-2, and records the assigned values in a duplicity ID 212 in a management table 21 (see FIG. 6). The management table 21 will be described later with reference to FIG. 6.

Otherwise, if the total sum of performance values (or performance scores) of the physical volumes 5-1 and 5-2 is smaller than the twice of the higher performance value of the two physical volumes 5, the performance measuring unit 13 deduces that the physical volumes 5-1 and 5-2 were created from a single RAID group. For example, if the total sum of performance values (or performance scores) of two physical volumes 5 is smaller than the twice of the higher performance value of the two physical volumes 5 by a predetermined range (e.g., 10%), the performance measuring unit 13 deduces that the physical volumes 5 have been created from a single RAID group. For physical volumes 5 deduced as being created from a single RAID group, the performance measuring unit 13 assigns the same duplicity ID to them and records the value in a duplicity ID 212 in the management table 21.

As described above, when a RAID group is created across multiple disk array apparatuses 4, the performance measuring unit 13 can determine, from the WWNN of the disk array apparatus 4, that multiple physical volumes 5 are configured from multiple RAID groups, and does not executes any combined performance verifications.

When "i" (i is an integer of 2 or greater) of physical volumes 5 are present in the virtual storage apparatus 3, the performance measuring unit 13 executes $_iC_2=(i\times(i-1))/2$ combined performance verifications. For example, there are 20 of physical volumes 5, the performance measuring unit 13 executes $(20\times(20-1))/2=190$ combined performance verifications.

For example, when 10, 4, and 6 volumes (20 of physical volumes 5 in total) are created from three disk array apparatuses 4-1, 4-2, and 4-3, respectively, the performance measuring unit 13 executes combined performance verifications in the following numbers, for the disk array apparatuses 4:

The disk array apparatus 4-1: $(10\times(10-1))/2=45$
The disk array apparatus 4-2: $(4\times(4-1))/2=6$
The disk array apparatus 4-3: $(6\times(6-1))/2=15$ meaning 45+6+15=66 combined performance verifications, in total.

Examples of performance scores obtained by the performance measuring unit 13 are illustrated in FIG. 3.

FIG. 3 is a table illustrating examples of performance scores obtained by the performance measuring unit 13 as an example of an embodiment.

In this example in FIG. 3, the performance measuring unit 13 obtains, for each physical volume 5, ten performance values, such as data transfer rate, response times, IOPS (average values, lower limits, upper limits) of a Sequential Read, a Sequential Write, a Random Read, and a Random Write, for example. The performance measuring unit 13 then normalizes these values into performance scores in a range from 0 to 10, for example, and then sums these ten performance scores to obtain performance scores, in a range from 0 to 100.

The grouping unit 14 divides (groups) the physical volumes 5 into multiple performance groups, based on the total performance score of each physical volume 5 determined by the performance measuring unit 13, in accordance with a grouping rule 17. Note that the grouping rule 17 has been defined by a system administrator, in advance, for example.

The performance measuring unit 13 then records thus obtained performance scores in a performance score 213 in the management table 21.

Figure 4:
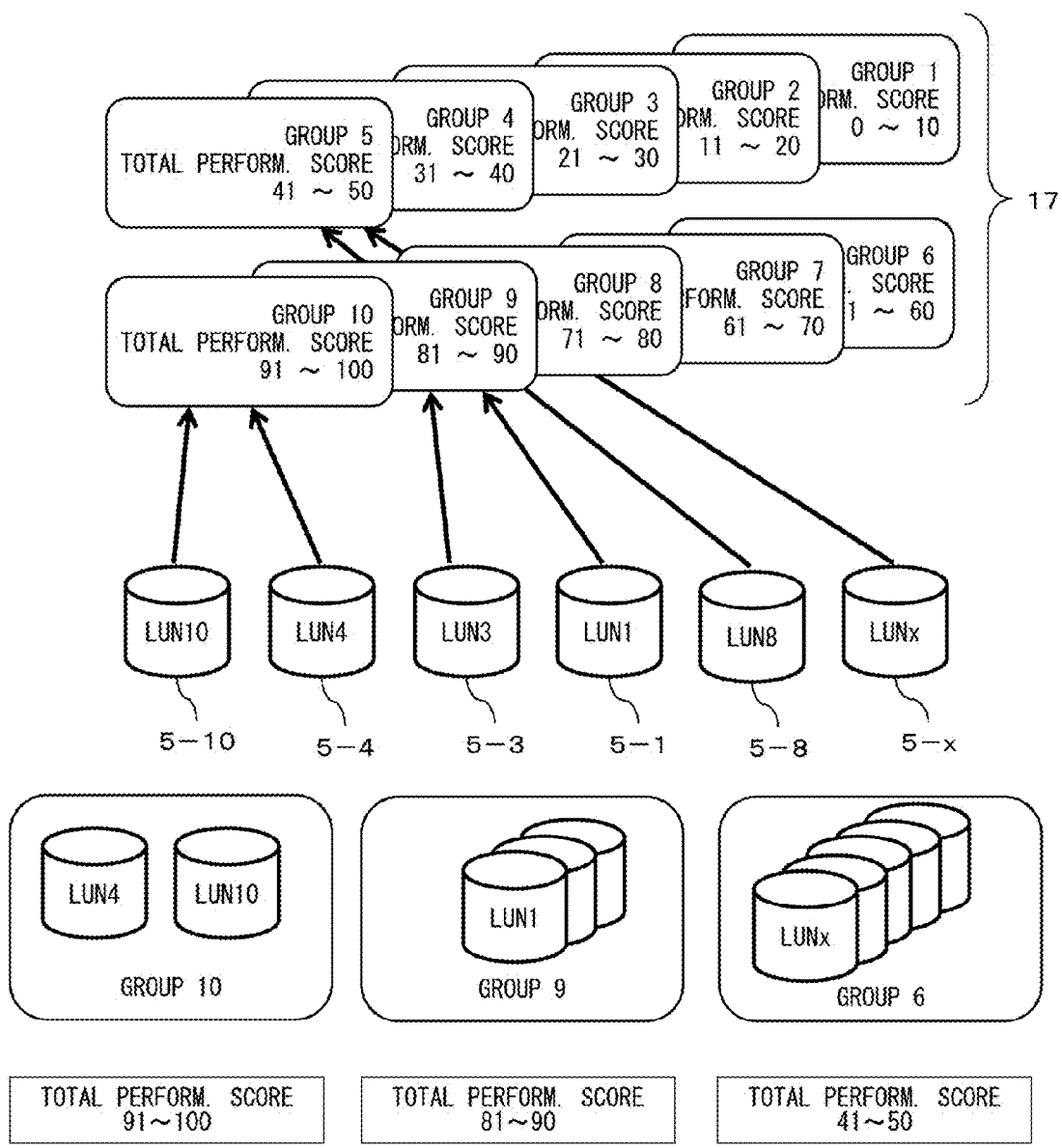
FIG. 4 is a schematic diagram illustrating an example of grouping by a grouping unit, and a grouping rule, as an example of an embodiment.

FIG. 4 is a schematic diagram illustrating an example of grouping by the grouping unit 14, and the grouping rule 17, as an example of an embodiment In this example in FIG. 4, the rule for grouping into 10 groups, each having different 10-interval performance score ranges, from 0 to 10, from 11 to 20, . . . , from 91 to 100, has been defined, in advance, by a system administrator or any other user of the information processing system 1. In accordance with this grouping rule 17, the grouping unit 14 then groups physical volumes 5 into Group 1 to 10, based on the total performance scores. The grouping unit 14 then records the determined grouping in a performance group 214 in the management table 21.

In this example in FIG. 4, the grouping unit 14 assigns the physical volume 5-4 (LUN 4) and the physical volume 5-10 (LUN 10) to Group 10 (total performance score of 91-100), based on their performance scores listed in FIG. 3, for example. Similarly, the grouping unit 14 assigns the physical volume 5-1 (LUN 1) to Group 9 (total performance score of 81-90).

A better performance generally can be achieved when storage areas are obtained across multiple physical volumes 5 (this technique is referred to as "stripe" or "striping"), rather than obtaining continuous storage areas from a single physical volume 5. This is because a sequential access results in multiple I/Os to multiple physical volumes 5 and simultaneous reads or writes are performed, if storage areas are striped from multiple physical volumes 5.

Striping with multiple physical volumes 5 may improve the performance by a factor of two or more of the performance of a single physical volume 5, at maximum.

For random accesses, an access with a duplicity of two or more, is distributed as accesses to multiple physical volumes 5, and read(s) and/or write(s) are made at a time. Hence, if the duplicity is sufficiently high, the performance is maximized, which is several times higher than the performance of a single physical volume 5.

As used therein, the term "duplicity" refers to the number of IO requests that can be handed at a time (simultaneously). For example, the duplicity of a single virtual volume 7 that can process four IO requests at a time processing is "4".

Further, if a performance of a single physical volume 5 is improved twofold or more, the performance may be improved by a factor of the number (count X) of physical volumes 5 (x times).

Figure 5:
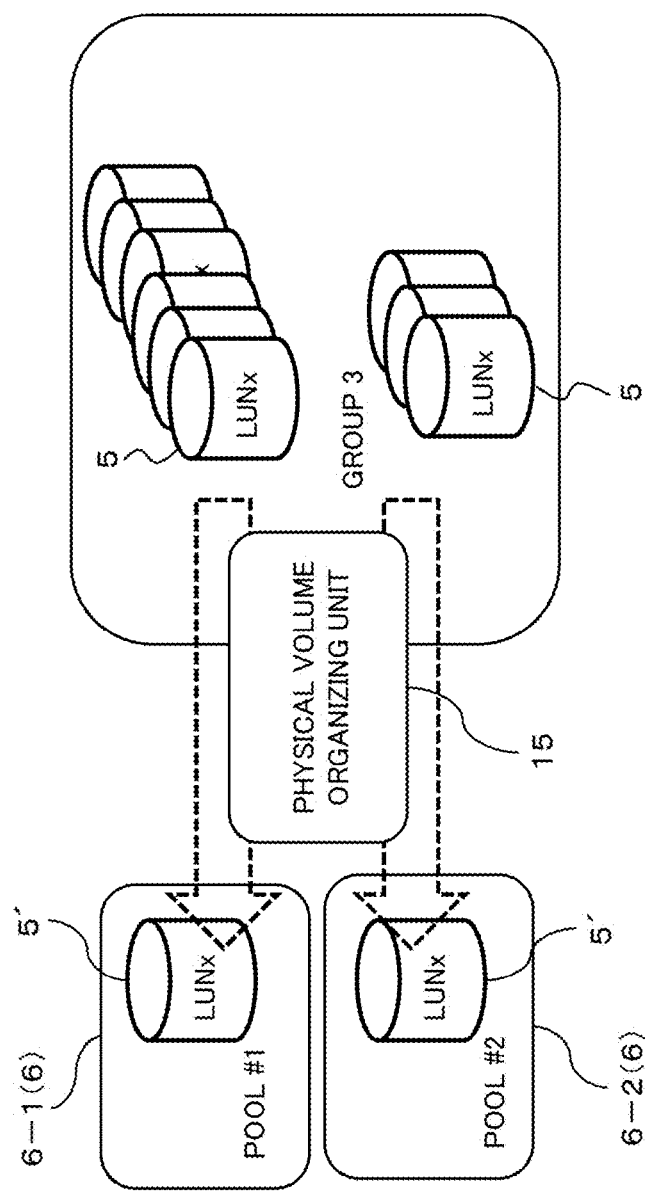
FIG. 5 is a schematic diagram illustrating an example of a physical volume reorganization by a physical volume organizing unit as an example of an embodiment.

Thus, when the total capacity of physical volumes 5 in a performance group does not reach a predetermined capacity, the physical volume organizing unit 15 bundles multiple physical volumes 5 in a lower-level performance group such that that performance group meets its performance requirement, to reorganize them as a physical volume 5' in that performance group (see FIG. 5). Hereinafter, the process to bundle multiple physical volumes 5 is referred to as "striping".

A physical volume reorganization by the physical volume organizing unit 15 is depicted in FIG. 5.

FIG. 5 is a schematic diagram illustrating an example of a physical volume reorganization by the physical volume organizing unit 15 as an example of an embodiment.

Firstly, the physical volume organizing unit 15 looks for candidate physical volumes 5 that are to be stripped.

Specifically, the physical volume organizing unit 15 selects multiple unallocated physical volumes 5 that belong to an equivalent performance group and have the same capacity, by looking up a management table 21 (described later), as striping candidates. Upon striping, the area in the same size is reserved from every physical volume 5. For that reason, in order to avoid having parts of physical volumes 5 remain unused and hence wasted, the physical volume organizing unit 15 selects physical volumes 5 having the same capacity, as candidates for striping. The physical volume organizing unit 15 does not select physical volumes 5 that have the same value of duplicity ID 212 in the management table 21 (meaning that these physical volumes 5 belong to the same RAID group).

Strictly speaking, physical volumes 5 provided from separate disk array apparatuses 4 may not have the exactly same capacities (e.g., with some errors of 1 MB or so). If the differences between the capacities of the physical volumes 5 are within a predetermined tolerance range (e.g., within 5%), however, the physical volume organizing unit 15 regards those physical volumes 5 as having the same capacity.

Then, the physical volume organizing unit 15 executes a preliminary performance verification to determine whether or not a performance equivalent to that of the higher-level storage pool 6 can be obtained by striping physical volumes 5 that have been selected as candidates.

In this case, the physical volume organizing unit 15 executes a preliminary performance verification in the manner similar to that of the performance verification by the above-described performance measuring unit 13. Then, the physical volume organizing unit 15 compares a performance score resulted from the preliminary performance verification against the performance requirement 213 in the management table 21 stored in the higher-level storage pool 6. If the performance score resulted from the preliminary performance verification is equivalent to the performance requirement 213 of the higher-level storage pool 6 (e.g., 90% or more the performance requirement 213 of the higher-level storage pool 6), the physical volume organizing unit 15 determines that the performance requirement of the higher-level storage pool 6 is satisfied with a striping.

Then, if a performance equivalent to that of the higher-level storage pool 6 is obtained in the preliminary performance verification, the physical volumes 5 that are selected as the candidates are added to the stripe. Hereinafter, the process of striping physical volumes 5 for achieving a performance score that is comparative to the performance requirement 213 of the higher-level storage pool 6 is referred to as "reorganizing the physical volumes 5". The physical volume organizing unit 15 adds the reorganized physical volume 5 to the higher-level performance group.

In this example in FIG. 5, the physical volume organizing unit 15 stripes the physical volumes 5 allocated to Group 3 into reorganized physical volumes 5'. Then, as described later, the storage pool managing unit 16 adds the reorganized physical volume 5' to the storage pools 6-1 and 6-2.

The storage pool managing unit 16 allocates the grouped physical volume 5 to the storage pool 6 in accordance with the storage pool rule 18, and stores the results in the storage pool table 22 (which will be described later with reference to FIG. 7) for each performance requirement.

The storage pool rule 18 is a rule for adding grouped physical volumes 5 to the corresponding storage pools 6. The storage pool rule 18 stipulates the number of storage pools 6 and respective performance values or performance scores required for storage pool 6 (hereinafter, those performance values or performance scores are collectively referred to as the "performance requirement") and capacities, for example. The storage pool rule 18 is defined in the storage control unit 11, in advance by a system administrator or other users.

The management table 21 is a table used by the storage control unit 11 to control the physical volumes 5.

FIG. 6 is a diagram illustrating a structure of the management table 21 as an example of an embodiment.

The management table 21 includes a physical volume ID 211, a duplicity ID 212, a performance score 213, a performance group 214, an update performance score 215, and an update performance group 216 in a table format.

The physical volume ID 211 stores information (identifier) that uniquely identifies the physical volumes 5 present in the virtual storage apparatus 3.

The duplicity ID 212 stores a duplicity ID of a physical volume 5. The duplicity ID 212 is set by the physical volume detecting unit 12, by looking up the WWNN of the disk array apparatus 4 where that physical volume 5 has been created, for example.

Alternatively, in the case where the duplicities of the physical volumes 5 cannot be obtained from a WWNN, performance verifications are executed at a time on multiple physical volumes 5 and a value of the duplicity ID deduced by the performance measuring unit 13 is stored in the duplicity ID 212.

The performance score 213 stores a total performance score for each physical volume 5 obtained by the performance measuring unit 13.

The performance group 214 stores information (identifier) that uniquely identifies the performance group to which the physical volume 5 belongs, which is determined by the grouping unit 14.

The update performance score 215 stores the total performance score of the physical volume 5 when that physical volume 5 was initially added to the virtual storage apparatus 3, which is obtained by the performance measuring unit 13.

The update performance group 216 stores a value indicating the performance group to which the physical volume 5 belong when that physical volume 5 was initially added to the virtual storage apparatus 3, which is determined by the grouping unit 14.

The storage pool table 22 is a table used by the storage control unit 11 for controls (admiration) of the storage pools 6.

Figure 7:
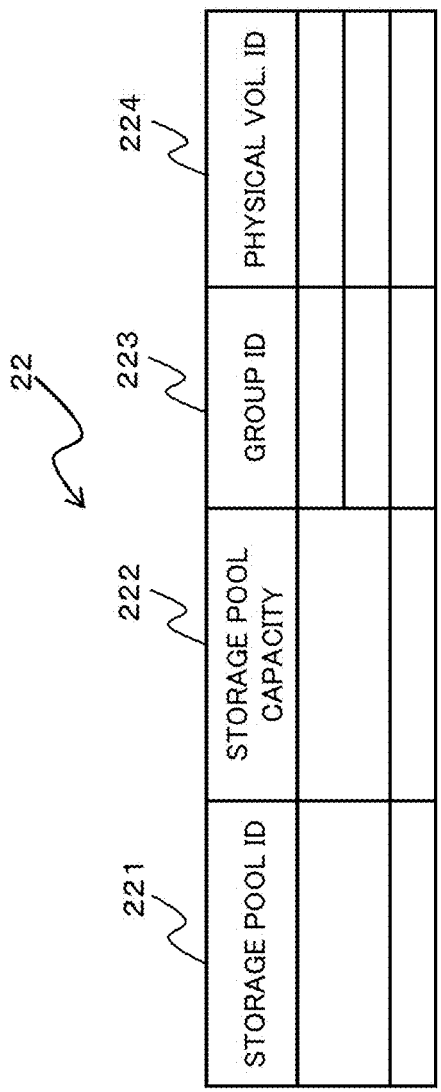
FIG. 7 is a diagram illustrating a structure of a storage pool table as an example of an embodiment.

FIG. 7 is a diagram illustrating a structure of the storage pool table 22 as an example of an embodiment.

The storage pool table 22 includes, a storage pool ID 221, a storage pool capacity 222, a group ID 223, and a physical volume ID 224 in a table format.

The storage pool ID 221 stores information (identifier) that uniquely identifies the respective storage pool ID 221 present in the virtual storage apparatus 3.

The storage pool capacity 222 stores a value indicating the total storage capacity of the storage pools 6.

The group ID 223 stores information (identifier) that uniquely identifies the performance group to which the physical volume 5 that has been allocated to the storage pool 6 (which is identified by a physical volume ID 224) belongs. One storage pool ID 221 includes one or more, typically multiple group IDs 223. The group ID 223 is set by the storage pool managing unit 16.

The physical volume ID 224 stores information (identifier) that uniquely identifies physical volume 5 that has been allocated to the storage pool 6. One storage pool ID 221 includes one or more, typically multiple physical volumes ID 224. The physical volume ID 224 is set by the storage pool managing unit 16.

The data relocation flag 23 (FIG. 2) is a flag indicating whether or not the storage pool managing unit 16, when a new physical volume 5 is added (included) to the virtual storage apparatus 3, is to migrate user data stored in an existing physical volume 5 to that newly-added physical volume 5. The data relocation flag 23 is set by a system administrator or any other user of the information processing system 1, for example.

For example, when the data relocation flag 23 is set to OFF (e.g., a value of '0'), the storage pool managing unit 16 does not migrate user data stored in an existing physical volume 5 to the added physical volume 5. In contrast, if the data relocation flag 23 is set to ON (e.g., a value of '1'), the storage pool managing unit 16 migrates user data stored in an existing physical volume 5 to the added physical volume 5.

The data relocation flag 23 is set by a system administrator or other users, depending on whether the user data is to be automatically migrated to a new physical volume 5.

For example, a high-speed physical volume 5 is added for the purpose of creating a storage pool 6. In such an example, when no data relocation flag 23 is set, the user data is to be automatically reallocated to that new physical volume 5. If the system administrator does not wish any migration of the data to the added physical volume 5 so as to create a new storage pool 6, for example, the data relocation flag 23 is set to OFF.

Note that, in the present embodiment, a CPU (not illustrated) in the storage virtualization apparatus 8 functions as the storage control unit 11, the physical volume detecting unit 12, the performance measuring unit 13, the grouping unit 14, the physical volume organizing unit 15, and the storage pool managing unit 16, described above, by executing a storage control program.

Note that a program (storage control program) for implementing the functions as the storage control unit 11, the physical volume detecting unit 12, the performance measuring unit 13, the grouping unit 14, the physical volume organizing unit 15, and the storage pool managing unit 16 are provided in the form of programs recorded on a computer readable recording medium, such as, for example, a flexible disk, a CD (e.g., CD-ROM, CD-R, CD-RW), a DVD (e.g., DVD-ROM, DVD-RAM, DVD-R, DVD+R, DVD-RW, DVD+RW, HD-DVD), a Blu-ray disc, a magnetic disk, an optical disk, a magneto-optical disk, or the like. The computer then reads a program from that storage medium using a medium reader (not illustrated) and uses that program after transferring it to an internal storage apparatus or external storage apparatus or the like. Alternatively, the program may be recoded on a storage unit (storage medium), for example, a magnetic disk, an optical disk, a magneto-optical disk, or the like, and the program may be provided from the storage unit to the computer through a communication path.

Upon embodying the functions as the storage control unit 11, the physical volume detecting unit 12, the performance measuring unit 13, the grouping unit 14, the physical volume organizing unit 15, and the storage pool managing unit 16, the program (storage management program) stored in an internal storage apparatuses (a memory (not illustrated) in the storage virtualization apparatus 8, in the present embodiment) is executed by a microprocessor of the computer (a CPU (not illustrated) in the storage virtualization apparatus 8, in the present embodiment). In this case, the computer may alternatively read a program stored in a storage medium for executing it.

A memory (not illustrated) in the storage virtualization apparatus 8 functions as a storing unit for storing the grouping rule 17, the storage pool rule 18, the management table 21, the storage pool table 22, and the data relocation flag 23.

(B) Operations

Operations in the information processing system 1 will be described with reference to FIGS. 8 to 15.

(B-1) Overview of Operations

Figure 8:
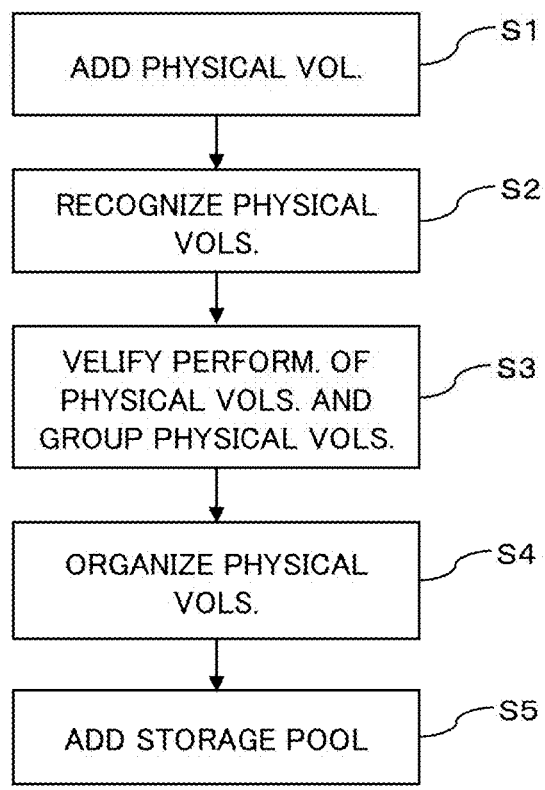
FIG. 8 is a flowchart illustrating an overview of operations in the information processing system as an example of an embodiment.

FIG. 8 is a flowchart (Steps S1 to S5) illustrating an overview of operations in an information processing system 1 as an example of an embodiment.

In Step S1, a new physical volume 5 is added in the virtual storage apparatus 3. Examples of such a scenario include a new virtual storage apparatus 3 is installed in the information processing system 1, or a new physical volume 5 is added to an existing virtual storage apparatus 3.

Next, in Step S2, the physical volume detecting unit 12 detects that the new physical volume 5 has been added in Step S1. In this case, the physical volume detecting unit 12 receives an RSCN that was sent from the disk array apparatus 4 where the added physical volume 5 resides, thereby becoming aware of the addition of the physical volume 5 to the disk array apparatus 4.

In Step S3, the performance measuring unit 13 measures performance scores for each predetermined access pattern for all physical volumes 5, including the physical volume 5 added in Step S1, and calculates total performance scores. The grouping unit 14 then groups every physical volume 5 into an appropriate performance group, in accordance with the grouping rule 17, using the calculated total performance scores.

Next, if there is any higher-level performance group created in Step S3, whose performance does not satisfy a predetermined performance requirement, in Step S4, the physical volume organizing unit 15 performs a physical volume reorganization. Specifically, the physical volume organizing unit 15 bundles (stripes) multiple physical volumes 5 in a lower-level performance group, and the bundled volume them to the higher-level performance group failing to meet its performance requirement such that the higher-level performance group meets its performance requirement.

In Step S5, each physical volume 5 designated to an appropriate performance group by the storage pool managing unit 16 in Steps S3 to S4, is added to the storage pool 6, in accordance with the storage pool rule 18.

The details of the operations in FIG. 8 will be described, with reference to two scenarios: an initial installation of a virtual storage apparatus 3, and an addition of a physical volume to an existing virtual storage apparatus 3.

(B-2) Initial Installation

Figure 9:
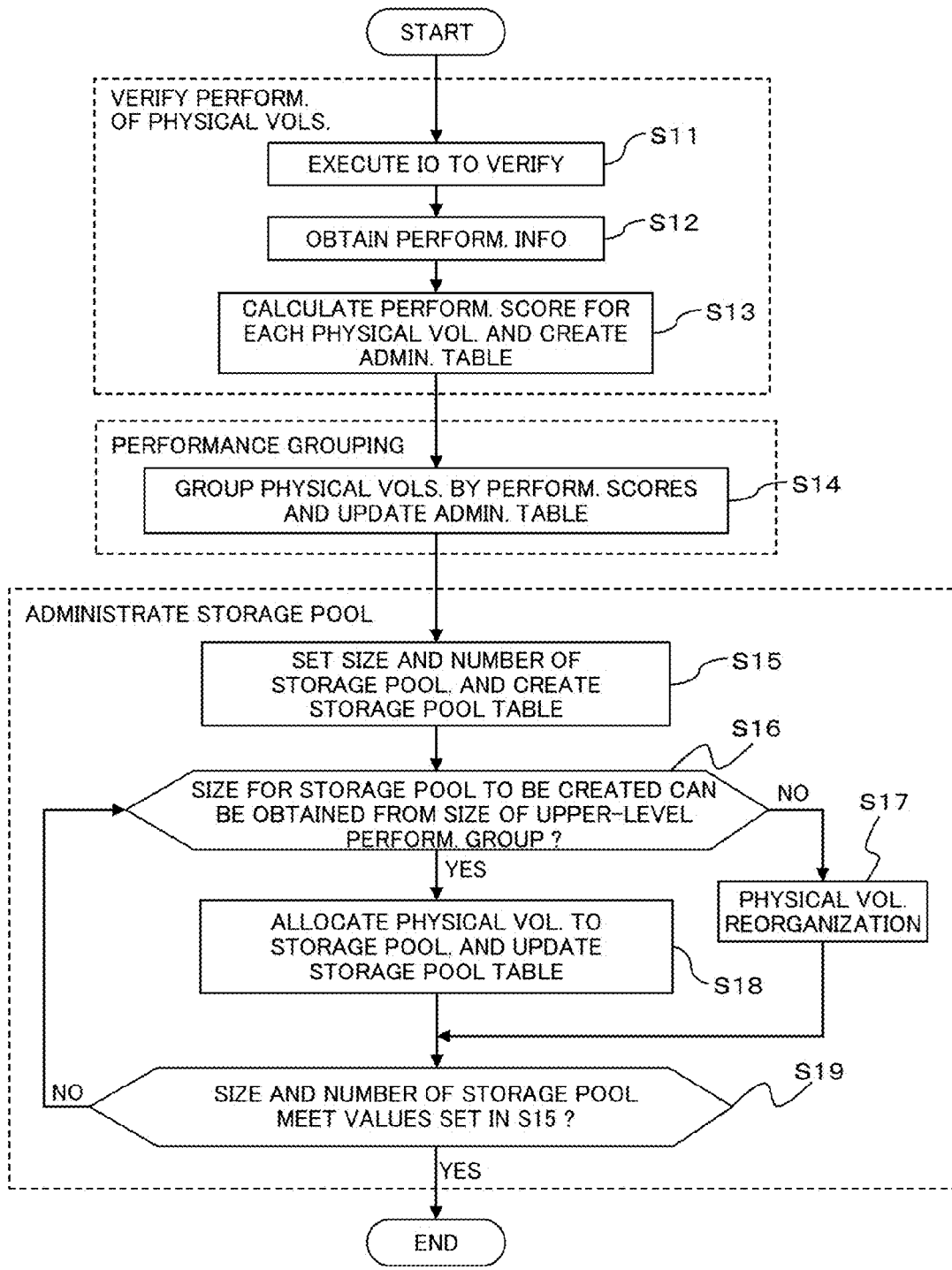
FIG. 9 is a flowchart illustrating operations upon an initial installation of a virtual storage apparatus in the information processing system as an example of an embodiment.

FIG. 9 is a flowchart (Steps S11 to S19) illustrating operations upon an initial installation of a virtual storage apparatus 3 in the information processing system 1 as an example of an embodiment.

During an initial start-up of the storage virtualization apparatus 8, when the disk array apparatus 4 to which a physical volume 5 has been created is connected, the physical volume detecting unit 12 receives an RSCN from the disk array apparatus 4 and detects that physical volume 5.

Then, in Steps S11 to S13, the performance measuring unit 13 executes a performance verification.

Specifically, in Step S11, the performance measuring unit 13 executes an I/O run on each physical volume 5, for validating performances.

In Step S12, the performance measuring unit 13 obtains performance values from the I/O run executed in Step S11.

In Step S13, the performance measuring unit 13 calculates performance scores for each physical volume 5 from the performance values obtained in Step S12, and calculates the total performance scores. The performance measuring unit 13 records the calculated total performance scores in the performance score 213 in the management table 21.

The performance measuring unit 13 also determines a duplicity for each physical volume 5, and records the determined results in the duplicity ID 212 in the management table 21. Specifically, the performance measuring unit 13 assigns a common duplicity ID to physical volumes 5 created from the same RAID group, while assigning different duplicity IDs to physical volumes 5 created from different RAID groups. The performance measuring unit 13 then records the duplicity IDs assigned to the physical volumes 5, in the duplicity ID 212 in the management table 21.

In Step S14, the grouping unit 14 groups the physical volumes 5 into performance groups, based on the performance scores calculated in Step S13. For example, in the example depicted in FIG. 4, if the performance score of a physical volume 5 falls within a range of 1 to 10, that physical volume 5 is designated to Performance group 0. Then, the determined grouping is recorded in the performance group 214 in the management table 21.

An example of the management table 21 after Steps S13 and S14 is illustrated in FIG. 10.

In this example in FIG. 10, in Step S13, it is determined that the duplicity ID of the physical volume 5 with an ID of "LUN 001" is 0 and its performance score is 85, in Step S14, this physical volume 5 is designated to Performance Group 9. Similarly, it is determined that the duplicity ID of the physical volume 5 with an ID of "LUN 002" is 1 and its performance score is 53, this physical volume 5 is designated to Performance group 6. It is determined that the duplicity ID of the physical volume 5 with an ID of "LUN 003" is 1 and its performance score is 57, this physical volume 5 is designated to Performance group 6. Note that, in Step S13, since the performance measuring unit 13 determines that the physical volumes 5 with an ID of "LUN 002" and an ID of "LUN 003" belong to the same RAID group, it provides the two physical volumes 5 with the same duplicity ID of "1".

Next, in Steps S15 to S19, the storage pool managing unit 16 executes a storage pool management.

Specifically, in Step S15, the storage pool managing unit 16 sets sizes, the total number (count), and the performance rating for storage pools 6 to be created, based on information set by an administrator or any other user of the information processing system 1, in advance, for example, and generates the storage pool table 22.

Here, for example, the storage pool managing unit 16 is to create the following three storage pools 6.

The storage pool 6-1: 1 tera byte (TB) (performance rating=1)
The storage pool 6-2: 2 TB (performance rating=2)
The storage pool 6-3: 2 TB (performance rating=3)

In Step S16, the storage pool managing unit 16 creates storage pools 6 set in Step S15, in the descending order of the top performance rating of the storage pool 6 (creates the highest-performance storage pool 6, first). The storage pool managing unit 16 determines whether or not storage pools 6 can be created only from the total capacity of the highest-level performance group.

For example, the storage pool managing unit 16 is to create a 1-TB storage pool 6-1, using the grouping rule 17 exemplified in FIG. 4. In this example in FIG. 4, the highest-level performance group is Group 10. In this case, it is determined whether or not the physical volumes 5 present in Group 10 has a total capacity of at least 1 TB.

If it can be created from the total capacity of the highest-level performance group (refer to the YES route from Step S16), the flow moves to Step S18 which will be described later.

Otherwise, if it cannot be created from the total capacity of the highest-level performance group (refer to the NO route from Step S16), in Step S17, the physical volume organizing unit 15 executes a physical volume reorganization which will be described later with reference to FIG. 15, to add the deficient capacity to a storage pool 6 to be created.

For example, as in the example in FIG. 5, the physical volume organizing unit 15 reorganizes three physical volumes 5 belonging to Group 6 to stripe them such that the performance is satisfied for Group 9.

In Step S18, the storage pool managing unit 16 creates physical volumes 5 in the storage pool 6, and records the physical volumes 5 created in the respective storage pools 6 into the storage pool table 22.

In Step S19, the storage pool managing unit 16 determines whether or not all storage pools 6 set in Step S15 have been created.

If all of the storage pools 6 have been created (refer to the YES route from Step S19), this flow ends.

If not all of the storage pools 6 have been created (refer to the NO route from Step S19), the storage pool managing unit 16 returns to Step S16 and repeats the above-described Step S16 to S18 until all of the storage pools 6 have been created.

(B-3) Addition of Physical Volume 5

Figure 11:
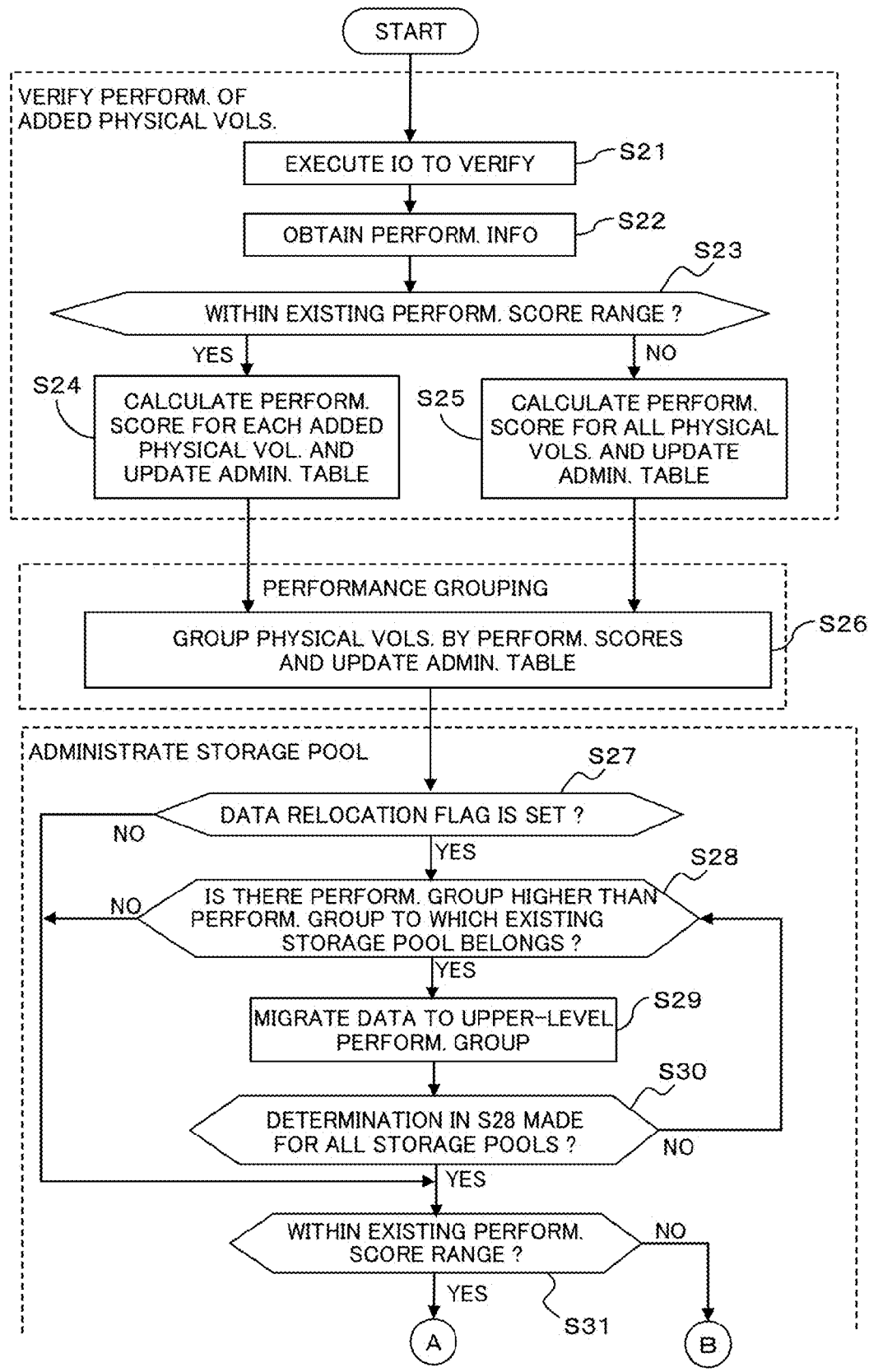
FIGS. 11 and 12 are flowcharts illustrating operations upon addition of a physical volume in the information processing system as an example of an embodiment.
Figure 12:
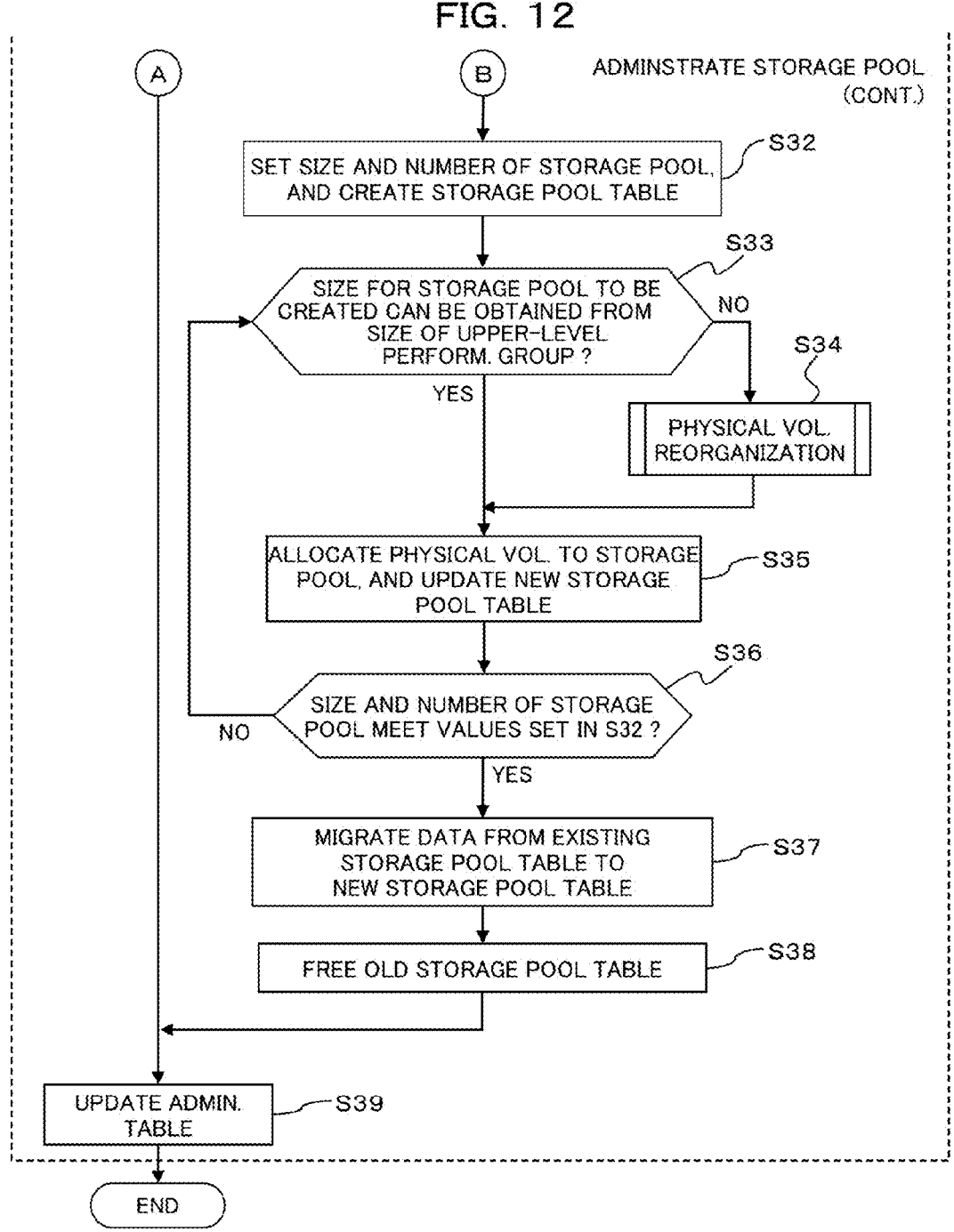

FIGS. 11 and 12 are flowcharts (Steps S21 to S31 in FIG. 1, and Steps S32 to S39 in FIG. 12) illustrating operations upon addition of a physical volume 5 in the information processing system 1 as an example of an embodiment.

When a storage virtualization apparatus 8 is added to the disk array apparatus 4, the physical volume detecting unit 12 receives an RSCN from the disk array apparatus 4 and becomes aware of the physical volumes 5.

Then, in Step S21 to S25, the performance measuring unit 13 executes a performance verification.

Specifically, in Step S21, the performance measuring unit 13 executes an I/O run on each physical volume 5, for validating the performances.

In Step S22, the performance measuring unit 13 obtains performance values produced in the I/O run executed in Step S21.

In Step S23, the performance measuring unit 13 determines whether or not the performance value of the new physical volume 5 obtained in Step S22 falls between the maximum and minimum values of performance values of the existing physical volumes 5.

If the performance value falls between the maximum and minimum values of performance values of the existing physical volumes 5 (refer to the YES route from Step S23), in Step S24, the performance measuring unit 13 calculates performance scores of added physical volume 5 from the performance value obtained in Step S22, and calculates the total performance scores. The performance measuring unit 13 records the calculated total performance score in the performance score 213 in the management table 21.

Otherwise, if the performance value does not fall between the maximum and minimum values of performance values of the existing physical volumes 5 (refer to the NO route from Step S23), in Step S25, the performance measuring unit 13 calculates performance scores of every physical volume 5 from its performance value obtained in Step S22, and calculates the total performance scores. The performance measuring unit 13 records the calculated total performance score in the update performance score 215 in the management table 21.

As an exemplary scenario when the processing in Step S25 is executed, for example, in the virtual storage apparatus 3 used to have only physical volumes 5 configured from HDDs, a new physical volume 5 configured from an SSD is created.

If the performance value falls between the maximum and minimum values of performance values of the existing physical volumes 5 in Step S23, in Step S26, the grouping unit 14, based on the performance score calculated in Step S24, groups the physical volumes 5 into performance groups. The result of the grouping is then recorded into the performance group 214 in the management table 21. Otherwise, if the performance value does not fall between the maximum and minimum values of performance values of the existing physical volumes 5 in Step S23, the grouping unit 14 groups the physical volumes 5 into performance groups, based on the performance scores calculated in Step S25. The result of the grouping is then recorded into the update performance group 216 in the management table 21.

FIG. 13 illustrates an example of the management table 21 after Steps S25 and S26.

In this example in FIG. 13, it is determined that the total performance scores and the total performance scores of the new physical volumes 5 with ID "LUN 0xx" and "LUN 0yy" do not fall between the maximum and minimum values of the total performance scores of the existing physical volumes 5 in Step S23. Then, in Step S25, it is determined that the performance score of the physical volume 5 of ID "LUN 0xx" is 97, and in Step S26, that physical volume 5 is assigned to Performance Group 10. Similarly, it is determined that the performance score of the physical volume 5 of ID "LUN 0yy" is 100, and that physical volume 5 is assigned to Performance Group 10. The previous performance score of the existing physical volume 5 of ID "LUN 001" was 85 and assigned to Performance Group 9, and its performance score is declined to 73 in Step S25 following the addition of the new high-performance physical volume 5. In Step S26, that physical volume 5 is degraded from Performance Group 9 to Performance Group 8. Similarly, the previous performance score of the existing physical volume 5 of ID "LUN 002" was 53. Now, its performance score is declined to 41 and that physical volume 5 is degraded to Performance Group 5.

Next, in Step S27 to S39, the storage pool managing unit 16 executes a storage pool management.

Specifically, in Step S27, the storage pool managing unit 16 checks whether or not the data relocation flag 23 is set to ON.

If the data relocation flag 23 is set to ON (refer to the YES route from Step S27), data relocation (data migration to the performance group) is needed. Hence, in Step S28, the storage pool managing unit 16 determines, by looking up the storage pool table 22, whether or not there is any unallocated physical volume 5 in a performance group that is higher in level than the performance group where the existing storage pool 6 belongs to.

Otherwise, if the data relocation flag 23 is not set to ON (refer to the NO route from Step S27), the flow moves to Step S31 which will be described later.

As an exemplary scenario, the storage pool 6-1 is configured from physical volumes 5 belonging to Performance Group 8. In such an example, the storage pool managing unit 16 firstly determines whether or not there is any unallocated physical volume 5 in a higher-level performance group Performance Group 8 belonging to the storage pool 6-1.

An exemplary storage pool table 22 is illustrated in FIG. 14. In this example in FIG. 14, the storage pool ID 221 and the storage pool capacity 222 are empty for Performance Group 10 that is higher in level than Performance Group 8, and the storage pool managing unit 16 determines that there is any unallocated physical volume 5.

If there is any unallocated physical volume 5 in a higher-level performance group (refer to the YES route from Step S28), in Step S29, the storage pool managing unit 16 migrates data to the found unallocated physical volume 5 in the higher-level performance group. After the data is migrated, the storage pool managing unit 16 frees the allocation of the physical volume 5 that stored that data before the migration. In this example, the storage pool managing unit 16 also frees the physical volume 5 that have been reorganized in a physical volume reorganization (described later).

In Step S30, it is determined whether or not the determination in Step S28 has been executed for all of the storage pools 6.

If the determination in Step S28 has been executed for not all of the storage pools 6 (refer to the NO route from Step S30), the storage pool managing unit 16 returns to Step S28 and repeats Steps S28 to S29 until all storage pools are processed.

Otherwise, if the determination in Step S28 has been executed for all of the storage pools 6 (refer to the YES route from Step S30), or the determination is Step S27 or S28 is negative, in Step S31, the storage pool managing unit 16, in Step S23, determines whether or not the performance value falls between the maximum and minimum values of performance values of the existing physical volumes 5.

If the performance value falls between the maximum and minimum values of performance values of the existing physical volumes 5 in Step S23 (refer to the YES route from Step S31), the flow moves to Step S39 in FIG. 12 which will be described later.

Otherwise, if the performance value does not fall between the maximum and minimum values of performance values of the existing physical volumes 5 in Step S23 (refer to the NO route from Step S31), in Step S39 in FIG. 12, the storage pool managing unit 16 sets the capacity and the number of storage pools 6 to be created, and generates a new storage pool table 22.

In Step S33, the storage pool managing unit 16 creates the storage pools 6 set in Step S32, one by one in the descending order of the performance rating. The storage pool managing unit 16 determined whether or not the capacity of the storage pools 6 to be created can be reserved only from the total capacity of the highest-level performance group.

If it can be created from the total capacity of the highest-level performance group (refer to the YES route from Step S33), the flow moves to Step S35 which will be described later.

Otherwise, if it cannot be created from the total capacity of the highest-level performance group (refer to the NO route from Step S33), in Step S34, the physical volume organizing unit 15 executes a physical volume reorganization which will be described later with reference to FIG. 15, to add the deficient capacity to a storage pool 6 to be created.

In Step S35, the storage pool managing unit 16 allocates physical volumes 5 in the storage pool 6, and records the physical volumes 5 allocated to the respective storage pools 6 into the storage pool table 22.

In Step S36, the storage pool managing unit 16 determines whether or not the capacity and the number of all of the storage pools 6 satisfy the values set in Step S32.

If the capacity and the number of all of the storage pools 6 do not satisfy the values set in Step S32 (refer to the NO route from Step S36), the flow returns to Step S33.

If the capacity and the number of all of the storage pools 6 satisfy the values set in Step S32 (refer to the YES route from Step S36), in Step S37, the storage pool managing unit 16 migrates data in the old (existing) storage pool table 22 to a new storage pool table 22.

In Step S38, the storage pool managing unit 16 frees the old storage pool table 22.

In Step S39, the storage pool managing unit 16 updates the management table 21 and ends this flow.

(B-4) Physical Volume Reorganization

Hereinafter, a physical volume reorganization by the physical volume organizing unit 15 will be described with reference to FIG. 15.

Figure 15:
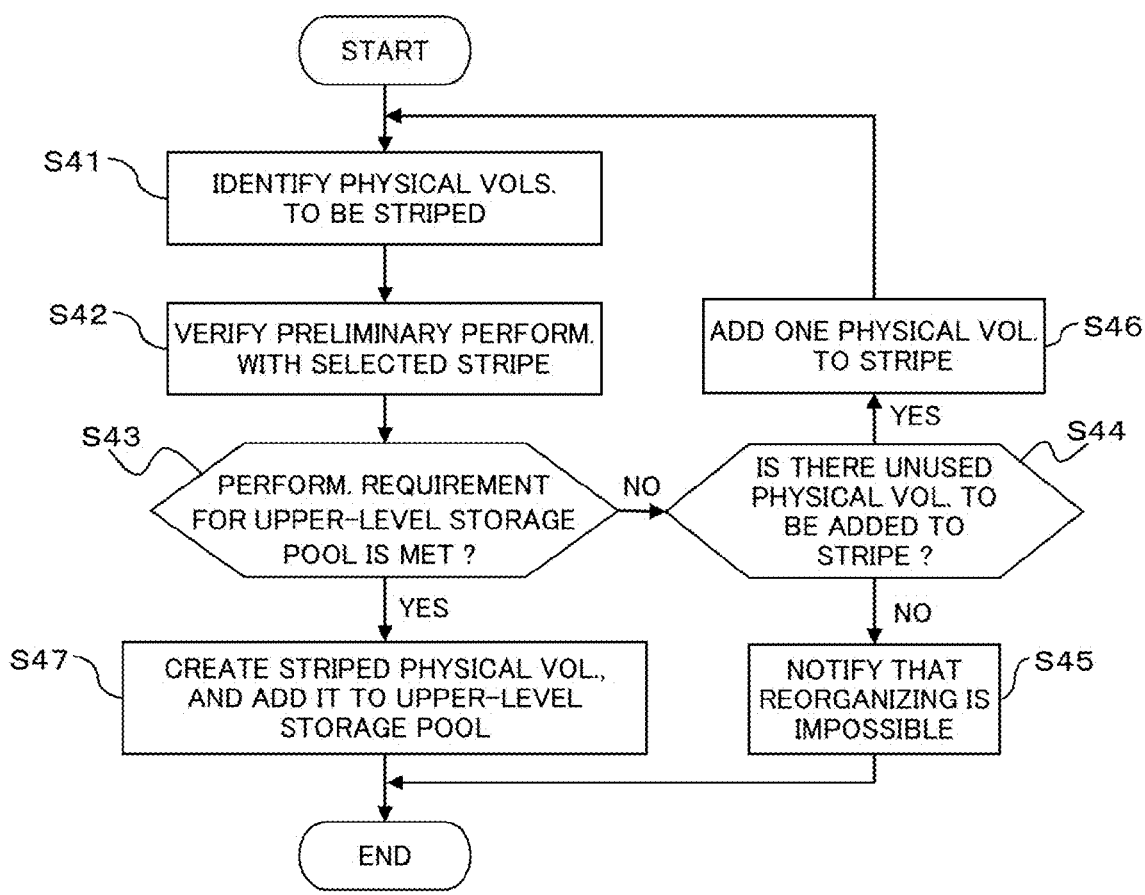
FIG. 15 is a flowchart illustrating a physical volume reorganization by a physical volume organizing unit as an example of an embodiment.
Figure 16:
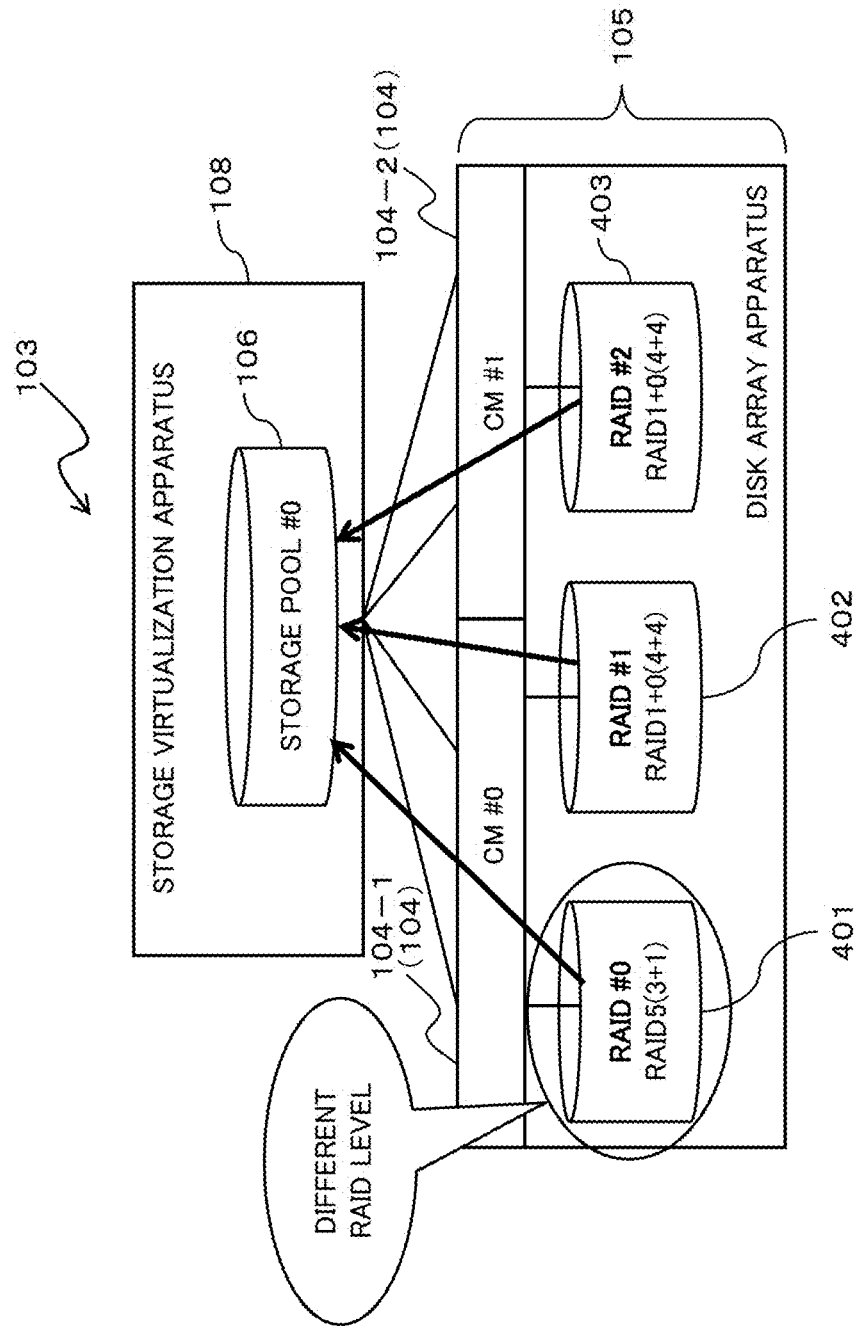
FIG. 16 is a schematic diagram illustrating a configuration of a conventional virtual storage apparatus.

FIG. 15 is a flowchart (Steps S41 to S47) illustrating a physical volume reorganization by the physical volume organizing unit 15 as an example of an embodiment.

In Step S41, the physical volume organizing unit 15 identifies physical volumes 5 to be striped.

Next, in Step S42, the physical volume organizing unit 15 executes a preliminary performance verification to determine whether or not a performance equivalent to that of the higher-level storage pool 6 can be obtained by striping the volumes selected in Step S41. This performance verification is executed in the manner similar to that of the performance verification which has been executed (measured) when a physical volume 5 were included.

Next, in Step S43, the physical volume organizing unit 15 determines whether or not the performance requirement of the higher-level storage pool 6 has been satisfied with the striping, in the preliminary performance verification in Step S41.

If the performance requirement of the higher-level storage pool 6 has not been satisfied with the striping (refer to the NO route from Step S43), in Step S44, the physical volume organizing unit 15 determines whether or not there is any unused physical volume 5 which can be added to the stripe.

If there is no unused physical volume 5 (refer to the NO route from Step S44), the target performance cannot be achieved even when all of the physical volumes 5 are add. In this case, in Step S45, the physical volume organizing unit 15 notifies the operator that no reorganization can be made, thereby prompting the operator to add a physical disk, and ends this flow. Once the operator adds a physical disk, this flow is executed again, and it is determined whether or not that additional disk is to be added to the higher-level storage pool 6.

Otherwise, if there is an unused physical volume 5 (refer to the YES route from Step S44), in Step S46, the physical volume organizing unit 15 adds that physical volume 5 to the stripe. The physical volume organizing unit 15 then returns to Step S41 and repeats the subsequent steps.

Otherwise, if the performance requirement of the higher-level storage pool 6 has been satisfied with the striping in Step S43 (refer to the YES route from Step S43), in Step S47, the physical volume organizing unit 15, creates a stripped physical volume 5, and adds it to the higher-level storage pool 6. Since the preliminary performance verification in Step S42 has proven that the performance value becomes equivalent to that of the higher-level storage pool 6, the stripped physical volume 5 is added to the higher-level storage pool 6, and that volume can be used from the higher-level server 2 subsequently.

(C) Advantageous Effects

As set forth above, in accordance with an example of the present embodiment, the physical volume detecting unit 12 in the storage control unit 11 recognizes that a physical volume 5 is added, and the performance measuring unit 13 executes a performance verification on the added physical volume 5. The grouping unit 14 then groups the physical volumes 5 in accordance with the results of the performance verification and adds physical volumes 5 to appropriate storage pools 6.

Hence, since physical volumes 5 having similar performance values are allocated to a performance group, a storage pool 6 that meets the required performance requirement can be autonomously configured.

Accordingly, the system administrator can configure a storage pool 6 with a predetermined capacity having a suitable performance, without requiring any knowledge of the performance and characteristic of each physical volume 5.

Furthermore, the physical volume organizing unit 15 stripes multiple physical volumes 5 of low-speed physical volumes 5, to create a single physical volume 5 that has a performance requirement exceeding those of the respective physical volumes 5. Then, the created physical volume 5 is added to the higher-level storage pool 6.

Accordingly, even when the virtual storage apparatus 3 has a number of low-speed physical volumes 5, the storage virtualization apparatus 8 can stripe such physical volumes 5 such that they can be used as a high-speed physical volume 5 belonging to the storage pool 6.

Furthermore, in the present embodiment, the storage pool managing unit 16 determines whether or not user data stored in an existing physical volume 5 is to be migrated to newly-added physical volume 5, by looking up the data relocation flag 23. Accordingly, when a high-speed physical volume 5 is added for creating a new storage pool 6, for example, the data is prevented from being migrated to the new volume 5.

Furthermore, in the present embodiment, the performance measuring unit 13 deduces duplicities indicating whether the respective physical volumes 5 belong to the same RAID group, during a performance verification. Accordingly, precise performances of the physical volumes 5 can be determined, which helps to improve the performance of the storage pool 6 created from the physical volume 5.

Furthermore, in the present embodiment, the physical volume detecting unit 12 becomes aware of a new physical volume 5 when it is created. This can help to simplify creation and management of the storage pools 6 even when a lot of physical volumes 5 are created.

(D) Miscellaneous

Note that the present disclosure is not limited to the embodiments described above, and various modifications may be made without departing from the spirit of the present disclosure.

For example, in the above-described embodiment, the performance measuring unit 13 converts the measured performance values of the physical volumes 5 into performance scores between 0 and 10. The performance measuring unit 13 may obtain scales indicating performances of the physical volumes 5 with any other methods.

In accordance with the disclosed technique, storage pools can be created in a virtual storage apparatus in a simplified manner.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A storage controller that controls a virtual storage apparatus, the storage controller including:
   a performance measuring unit that obtains performance information on a plurality of volumes present in the virtual storage apparatus;
   a grouping unit that groups the plurality of volumes into a plurality of performance groups, each of the plurality of performance groups having a different performance requirement, based on the performance information on the plurality of volumes and a grouping rule;
   a storage pool managing unit that adds, to a storage pool, one of volumes grouped into the plurality of performance groups until a requirement condition for the storage pool is met, the performance groups from which a virtual volume being to be reserved; and
   a reorganizing unit that generates, when a first performance group of the plurality of performance groups does not meet a performance requirement of the first performance group, a reorganized volume constructed from two or more volumes designated to a second performance group that has a lower performance requirement than that of the first performance group, and adds the reorganized volume to the first performance group such that the first performance group meets the performance requirement of the first performance group.

2. The storage controller according to claim 1, wherein
   the storage controller further includes a data relocation flag, and
   the storage pool managing unit blocks in response to a new volume being created in the virtual storage apparatus, a migration of data to that new volume, when the data relocation flag is invalidated.

3. The storage controller according to claim 1, wherein the performance measuring unit deduces respective duplicities for the plurality of volumes, from the performance information, the duplicities indicating whether the volumes are in the same redundancy group or not.

4. The storage controller according to claim 1, further including a volume detecting unit that detects that a new volume is added to the virtual storage apparatus.

5. A virtual storage apparatus, including:
   a plurality of volumes; and
   a storage controller, the storage controller including:
      a performance measuring unit that obtains performance information on the plurality of volumes;
      a grouping unit that groups the plurality of volumes into a plurality of performance groups, each of the plurality of performance groups having a different performance requirement, based on the performance information on the plurality of volumes and a grouping rule;
      a storage pool managing unit that adds, to a storage pool, one of volumes grouped into the plurality of performance groups until a requirement condition for the storage pool is met, the performance groups from which a virtual volume being to be reserved; and
      a reorganizing unit that generates, when a first performance group of the plurality of performance groups does not meet a performance requirement of the first performance group, a reorganized volume constructed from two or more volumes designated to a second performance group that has a lower performance requirement than that of the first performance group, and adds the reorganized volume to the first performance group such that the first performance group meets the performance requirement of the first performance group.

6. A non-transitory computer readable recording medium storing a storage control program for controlling a virtual storage apparatus, when being executed by a computer, the storage control program causing the computer to execute processing of:
   obtaining performance information on a plurality of volumes present in the virtual storage apparatus;
   grouping the plurality of volumes into a plurality of performance groups, each of the plurality of performance groups having a different performance requirement, based on the performance information on the plurality of volumes and a grouping rule;
   adding, to a storage pool, one of volumes grouped into the plurality of performance groups until a requirement condition for the storage pool is met, the performance groups from which a virtual volume being to be reserved; and
   generating, when a first performance group of the plurality of performance groups does not meet a performance requirement of the first performance group, a reorganized volume constructed from two or more volumes in a second performance group that has a lower performance requirement than that of the first performance group, and adding the reorganized volume to the first performance group such that the first performance group meets the performance requirement of the first performance group.

7. The non-transitory computer readable recording medium according to claim 6, wherein storage control program causes the computer to execute processing of blocking in response to a new volume being created in the virtual storage apparatus, a migration of data to that new volume, if a data relocation flag is invalidated.

8. The non-transitory computer readable recording medium according to claim 6, wherein storage control program causes the computer to execute processing of estimating respective duplicities for the plurality of volumes, from the performance information, the duplicities indicating whether the volumes are in the same redundancy group or not.

9. The non-transitory computer readable recording medium according to claim 6, wherein storage control program causes the computer to execute processing of detecting that a new volume is added to the virtual storage apparatus.

* * * * *